(12) United States Patent
Singh et al.

(10) Patent No.: US 10,802,995 B2
(45) Date of Patent: Oct. 13, 2020

(54) UNIFIED ADDRESS SPACE FOR MULTIPLE HARDWARE ACCELERATORS USING DEDICATED LOW LATENCY LINKS

(71) Applicant: Xilinx, Inc., San Jose, CA (US)

(72) Inventors: Sarabjeet Singh, San Jose, CA (US); Hem C. Neema, San Jose, CA (US); Sonal Santan, San Jose, CA (US); Khang K. Dao, San Jose, CA (US); Kyle Corbett, Campbell, CA (US); Yi Wang, San Jose, CA (US); Christopher J. Case, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 124 days.

(21) Appl. No.: 16/046,602

(22) Filed: Jul. 26, 2018

(65) Prior Publication Data

US 2020/0081850 A1 Mar. 12, 2020

(51) Int. Cl.
| | |
|---|---|
| *G06F 9/38* | (2018.01) |
| *G06F 13/16* | (2006.01) |
| *G06F 9/46* | (2006.01) |
| *G06F 12/0873* | (2016.01) |
| *G06F 12/1045* | (2016.01) |
| *G06F 12/1081* | (2016.01) |

(52) U.S. Cl.
CPC .......... *G06F 13/161* (2013.01); *G06F 9/467* (2013.01); *G06F 12/0873* (2013.01); *G06F 12/1045* (2013.01); *G06F 12/1081* (2013.01); *G06F 13/1673* (2013.01)

(58) Field of Classification Search
CPC ............. G06F 13/4068; G06F 9/45558; H04L 63/0428
See application file for complete search history.

(56) References Cited

U.S. PATENT DOCUMENTS

| | | | |
|---|---|---|---|
| 5,940,086 A | 8/1999 | Rentschler et al. | |
| 8,345,052 B1 * | 1/2013 | Diard | G06T 1/60 345/502 |
| 2005/0276413 A1 * | 12/2005 | Neogi | H04L 63/0428 380/28 |

(Continued)

OTHER PUBLICATIONS

A. Rios-Navaro et al., "Performance evaluation over HW/SW co-design SoC memory transfers for a CNN accelerator", May 9, 2018 (Year: 2018).*

(Continued)

*Primary Examiner* — Ryan Bertram
*Assistant Examiner* — Trang K Ta
(74) *Attorney, Agent, or Firm* — Kevin T. Cuenot

(57) ABSTRACT

A system may include a host processor coupled to a communication bus, a first hardware accelerator communicatively linked to the host processor through the communication bus, and a second hardware accelerator communicatively linked to the host processor through the communication bus. The first hardware accelerator and the second hardware accelerator are directly coupled through an accelerator link independent of the communication bus. The host processor is configured to initiate a data transfer between the first hardware accelerator and the second hardware accelerator directly through the accelerator link.

20 Claims, 6 Drawing Sheets

(56) References Cited

U.S. PATENT DOCUMENTS

| | | | |
|---|---|---|---|
| 2005/0278502 A1* | 12/2005 | Hundley | G06F 9/4843 |
| | | | 712/34 |
| 2010/0191823 A1* | 7/2010 | Archer | G06F 9/5066 |
| | | | 709/213 |
| 2011/0289279 A1 | 11/2011 | Sonnier et al. | |
| 2016/0321094 A1* | 11/2016 | Rabi | G06F 9/45558 |
| 2019/0034367 A1* | 1/2019 | Kakaiya | G06F 13/404 |
| 2019/0073194 A1 | 3/2019 | Howard et al. | |
| 2019/0303159 A1* | 10/2019 | Fryman | G06F 9/3802 |

OTHER PUBLICATIONS

Xilinx, Inc., "Aurora 8B/10B v 11.0, LogiCORE IP Product Guide," Vivado Design Suite, PG046, Chapters 1 and 2, Oct. 5, 2016, 115 pg, San Jose, CA USA.

Halvorsen, M., "Hardware Acceleration of Convolutional Neural Networks," (Master's thesis, NTNU), 66 pg.

Chen, Y.T. et al., "Interconnect synthesis of heterogeneous accelerators in a shared memory architecture," In 2015 IEEE/ACM International Symposium on Low Power Electronics and Design (ISLPED), Jul. 22, 2015, pp. 359-364.

\* cited by examiner

US 10,802,995 B2

UNIFIED ADDRESS SPACE FOR MULTIPLE HARDWARE ACCELERATORS USING DEDICATED LOW LATENCY LINKS

TECHNICAL FIELD

This disclosure relates to hardware acceleration and, more particularly, to facilitating use of multiple hardware accelerators through a unified address space and low latency communication links.

BACKGROUND

A heterogeneous computing platform (HCP) refers to a data processing system that includes a host processor coupled to one or more other devices through interface circuitry. The devices typically differ from the host processor architecturally. The host processor is capable of offloading tasks to the devices. The devices are capable of performing the tasks and making the results available to the host processor. As an illustrative example, the host processor is typically implemented as a central processing unit while the devices are implemented as graphics processing units (GPUs) and/or digital signal processors (DSPs).

In other HCPs, one or more of the devices that perform tasks offloaded from the host processor include devices adapted for hardware acceleration (referred to as "hardware accelerators"). The hardware accelerators include circuitry that is capable of performing a task offloaded from the host as opposed to executing software or program code to perform the task. The circuitry of the hardware accelerator is functionally equivalent to executing software, but is typically able to complete the task in less time.

Examples of hardware accelerators include programmable integrated circuits (ICs) such as field programmable gate arrays (FPGAs), partially programmable ICs, application specific ICs (ASICs), and so forth. Appreciably, an HCP may include a combination of different devices where one or more are adapted to execute program code and one or more others are adapted for hardware acceleration.

SUMMARY

In one or more embodiments, a system may include a host processor coupled to a communication bus, a first hardware accelerator communicatively linked to the host processor through the communication bus, and a second hardware accelerator communicatively linked to the host processor through the communication bus. The first hardware accelerator and the second hardware accelerator are directly coupled through an accelerator link independent of the communication bus. The host processor is configured to initiate a data transfer between the first hardware accelerator and the second hardware accelerator directly through the accelerator link.

In one or more embodiments, a hardware accelerator may include an endpoint configured to communicate with a host processor over a communication bus, a memory controller coupled to a memory local to the hardware accelerator, and a link circuit coupled to the endpoint and the memory controller. The link circuit is configured to establish an accelerator link with a target hardware accelerator also coupled to the communication bus. The accelerator link is a direct connection between the hardware accelerator and the target hardware accelerator that is independent of the communication bus.

In one or more embodiments, a method may include receiving, within a first hardware accelerator, an instruction and a target address for a data transfer sent from a host processor over a communication bus, the first hardware accelerator comparing the target address with an upper bound of an address range corresponding to the first hardware accelerator, and, in response to determining that the target address exceeds the address range based on the comparing, the first hardware accelerator initiating a transaction with a second hardware accelerator to perform a data transfer using an accelerator link that directly couples the first hardware accelerator and the second hardware accelerator.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
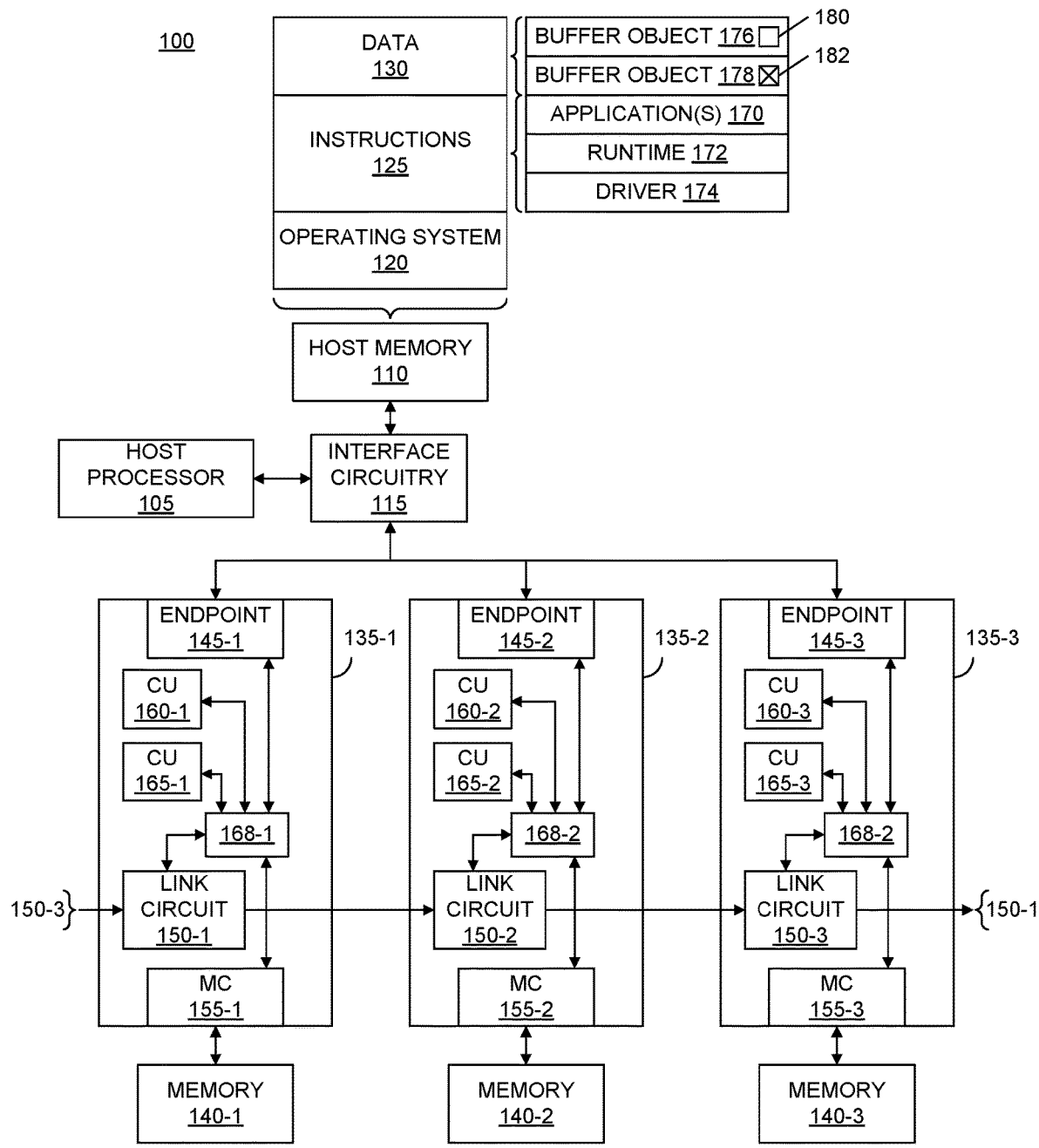
FIG. 1 illustrates an example of a system with multiple hardware accelerators.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to hardware acceleration and, more particularly, to facilitating use of multiple hardware accelerators through a unified address space and low latency communication links. Using hardware accelerators with data processing systems has become an effective technique for offloading tasks from the host processor thereby reducing the workload on the host processor. The hardware accelerators are typically attached to the host processor through a bus. For example, a hardware accelerator may be attached to a circuit board that is inserted into an available bus slot of the host system. Typically, each hardware accelerator is attached to a corresponding circuit board. Adding an additional hardware accelerator to a system usually entails inserting an additional circuit board with the hardware accelerator into an available bus slot.

Within conventional systems, applications executed by the host processor must be updated and/or rewritten to specifically access any newly added hardware accelerators (e.g., by hardware address). Further, to transfer data from one hardware accelerator to another, the data is moved from the source hardware accelerator to the host processor, and then from the host processor down to the target hardware accelerator. The data moves to and from each hardware accelerator through the host processor via the bus. As such, each additional hardware accelerator added to a system increases the number of devices on the bus thereby creating contention for bandwidth on the bus. As the complexity, number, and/or size of tasks performed by hardware accelerators (or other devices) increases, available bandwidth on the bus is further constrained.

In accordance with the inventive arrangements described within this disclosure, a unified address space for devices is provided. Further, direct communication links between hardware accelerators, referred to herein as "accelerator links", are provided that are capable of operating independently of the bus. A runtime library and driver executed by the host are capable of leveraging the unified address space so that applications executed by the host processor may operate without directly referencing (e.g., addressing) particular hardware accelerators in the system. The runtime library is capable of determining the proper addresses to use to effectuate data transfers among hardware accelerators. As such, the applications need not be modified to access additional hardware accelerators that may be added to the system. Further, data transfers may be performed over the accelerator links allowing data to be transferred directly from one hardware accelerator to another without passing through the host processor effectively bypassing the bus. As such, the bandwidth used by hardware accelerators on the bus may be significantly reduced, thereby increasing overall system performance.

As noted, additional hardware accelerators can be added to a system using the existing address space without requiring a corresponding change or modification to the program code (e.g., applications) executed by the host processor. This is supported, at least in part, through implementation of an automated discovery process for hardware accelerator boards and of adding such boards to the system, use of remote versus local buffer flags, automated switching to accelerator links for data transfers in at least some cases, and automated address translation for remote buffers.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of a system 100 with multiple hardware accelerators. System 100 is an example of computer hardware that may be used to implement a computer, a server, or other data processing system. System 100 is also an example of a heterogeneous computing system. As pictured, system 100 includes at least one host processor 105 coupled to host memory 110 through interface circuitry 115.

System 100 also includes a plurality of hardware accelerators 135. In the example of FIG. 1, system 100 includes three hardware accelerators 135-1, 135-2, and 135-3. While the example of FIG. 1 illustrates three hardware accelerators, it should be appreciated that system 100 may include fewer than three hardware accelerators or more than three hardware accelerators. Further, system 100 may include one or more other devices such as graphics processing units (GPUs) or digital signal processors (DSPs).

System 100 is capable of storing computer readable instructions (also referred to as "program code") within host memory 110. Host memory 110 is an example of computer readable storage media. Host processor 105 is capable of executing the program code accessed from host memory 110 via interface circuitry 115. In one or more embodiments, host processor 105 communicates with host memory 110 through a memory controller (not shown).

Host memory 110 may include one or more physical memory devices such as, for example, a local memory and a bulk storage device. Local memory refers to non-persistent memory device(s) generally used during actual execution of program code. Examples of local memory include random access memory (RAM) and/or any of the various types of RAM that are suitable for use by a processor during execution of program code such as DRAM, SRAM, DDR SDRAM, and the like. A bulk storage device refers to a persistent data storage device. Examples of bulk storage devices include, but are not limited to, a hard disk drive (HDD), a solid-state drive (SSD), flash memory, a read-only memory (ROM), an erasable programmable read-only memory (EPROM), electrically erasable programmable read-only memory (EEPROM), or other suitable memory. System 100 may also include one or more cache memories (not shown) that provide temporary storage of at least some program code to reduce the number of times program code must be retrieved from a bulk storage device during execution.

Host memory 110 is capable of storing program code and/or data. For example, host memory 110 may store an operating system 120, instructions 125, and data 130. In the example of FIG. 1, instructions 125 may include one or more applications 170, a runtime library (referred to herein as the "runtime") 172, and a driver 174 that is capable of communicating with hardware accelerators 135. Runtime 172 is capable of handling completion events, managing command queues, and providing notifications to application(s) 170. Data 130, among other types of data items, may include buffer objects such as buffer objects 176 and 178, which facilitate direct data transfers between hardware accelerators 135. Buffer object 176 includes a remote flag 180, while buffer object 178 includes a remote flag 182. For purposes of illustration remote flag 180 is not set, while remote flag 182 is set. System 100, e.g., host processor 105, is capable of executing operating system 120 and instructions 125 to perform the operations described within this disclosure.

Examples of interface circuitry 115 include, but are not limited to, a system bus and an input/output (I/O) bus. Interface circuitry 115 may be implemented using any of a variety of bus architectures. Examples of bus architectures may include, but are not limited to, Enhanced Industry Standard Architecture (EISA) bus, Accelerated Graphics Port (AGP), Video Electronics Standards Association (VESA) local bus, Universal Serial Bus (USB), and Peripheral Component Interconnect Express (PCIe) bus. Host processor 105 may be coupled to host memory 110 through different interface circuitry than is used to couple to hardware accelerators 135. For purposes of illustration, an endpoint for interface circuitry 115 through which host processor 105 communicates with other devices is not shown.

System 100 further may include one or more other I/O devices (not shown) coupled to interface circuitry 115. The I/O devices may be coupled to system 100, e.g., interface circuitry 115, either directly or through intervening I/O controllers. Examples of I/O devices include, but are not limited to, a keyboard, a display device, a pointing device, one or more communication ports, and a network adapter. A network adapter refers to circuitry that enables system 100 to become coupled to other systems, computer systems, remote printers, and/or remote storage devices through intervening private or public networks. Modems, cable modems, Ethernet cards, and wireless transceivers are examples of different types of network adapters that may be used with system 100.

In the example of FIG. 1, each of hardware accelerators 135-1, 135-2, and 135-3 is coupled to a memory 140-1, 140-2, and 140-3, respectively. Memories 140-1, 140-2, and 140-3 are implemented as RAMs as generally described in connection with host memory 110. In one or more embodiments, each hardware accelerator 135 is implemented as an IC. The IC may be a programmable IC. An example of a programmable IC is a Field Programmable Gate Array (FPGA).

In the example of FIG. 1, each of hardware accelerators 135 includes an endpoint 145, a link circuit 150, a memory controller (abbreviated "MC" in FIG. 1) 155, and interconnect circuitry 168. Each hardware accelerator 135 also includes one or more compute units (abbreviated "CU" in FIG. 1). A compute unit is a circuit that is capable of performing the tasks offloaded from host processor 105. For purposes of illustration, each of hardware accelerators 135 is shown to include a compute unit 160 and a compute unit 165. It should be appreciated that hardware accelerators 135 may include fewer or more compute units than shown.

In one example, each of endpoints 145 is implemented as a PCIe endpoint. It should be appreciated that endpoints 145 may be implemented as any type of endpoint suitable for communicating over the particular type or implementation of interface circuitry 115 that is used by system 100. Each of memory controllers 155 is coupled to a respective memory 140 to facilitate access (e.g., reading and writing) of that memory 140 by hardware accelerator 135.

In one or more embodiments, hardware accelerator 135-1 and memory 140-1 are attached to a first circuit board (not shown), hardware accelerator 135-2 and memory 140-2 are attached to a second circuit board (not shown), and hardware accelerator 135-3 and memory 140-3 are attached to a third circuit board (not shown). Each of these circuit boards may include suitable connectors for coupling to a bus port or slot. For example, each of the circuit boards may have a connector configured for insertion into an available PCIe slot (or other bus/interface connector) of system 100.

Each of link circuits 150 is capable of establishing an accelerator link with at least one other, e.g., neighboring, link circuit 150. As used herein, an "accelerator link" refers to a communication link that directly connects two hardware accelerators. For example, each of the circuit boards having a hardware accelerator 135 may be coupled through wires that connect to link circuits 150. Link circuits 150 may establish the accelerator links over the wires.

In particular embodiments, link circuits 150 are communicatively linked using a ring topology. Data that is sent via the accelerator link(s) established by link circuits 150 master from left to right as indicated by the directional arrows. For example, referring to the example of FIG. 1, the link circuit on the left (e.g., link circuit 150-1) may operate as a master, while the neighboring link circuit to the right (e.g., link circuit 150-2) may operate as a slave. Similarly, link circuit 150-2 may operate as a master with respect to link circuit 150-3. Link circuit 150-3 may operate as a master with respect to link circuit 150-1.

In one or more embodiments, each link circuit 150 includes a table or register specifying the amount (or size) of memory 140 for each hardware accelerator (e.g., on each board). Using the table, each link circuit 150 is capable of modifying addresses specified in transactions for purposes of exchanging information using the accelerator links. In particular embodiments, the table or register is static. In one or more other embodiments, the driver is able to read and/or update the information stored in the table or register dynamically, e.g., at runtime.

For purposes of illustration, operation of hardware accelerator 135-2 is described. It should be appreciated that like numbered components in each respective hardware accelerator are capable of operating in the same or similar manner. Accordingly, referring to hardware accelerator 135-2, link circuit 150-2 is capable of receiving a transaction from any of a variety of different sources or initiators and routing the transaction to any of a variety of targets. For example, link circuit 150-2 is capable of receiving a transaction from endpoint 145-2 (e.g., originating from host processor 105), compute unit 160-2, compute unit 165-2, hardware accelerator 135-1 via link circuit 150-1, or hardware accelerator 135-3 via link circuit 150-3 flowing to link circuit 150-1 and then on to link circuit 150-2. Link circuit 150-2 is capable of routing the transaction to any target such as endpoint 145-2 (e.g., to host processor 105), compute unit 160-2, compute unit 165-2, memory controller 155-2, hardware accelerator 135-1 via link circuit 150-3 and on to link circuit 150-1, or hardware accelerator 135-3 via link circuit 150-3, where the target is different from the source or initiator.

For example, host processor 105 is capable of accessing any location in memory 140-1, memory 140-2, and/or memory 140-3 as part of the unified address space. In accessing such memories, however, host processor 105 may do so by accessing a selected hardware accelerator, e.g., hardware accelerator 135-2, and then reaching any target such as memory 140-1, memory 140-2, or memory 140-3 through the selected hardware accelerator using the accelerator links.

As an illustrative and nonlimiting example, host processor 105 may initiate a data transfer involving hardware accelerators 135-2 and 135-3. Hardware accelerator 135-2 may be the initiator. In this example, host processor 105, e.g., runtime 172 and/or driver 174, creates buffer object 176 corresponding to hardware accelerator 135-2 and buffer object 178 corresponding to hardware accelerator 135-3. Host processor 105 sets remote flag 182 indicating that the target address for the data transfer (located in hardware accelerator 135-3) is remote relative to the initiating hardware accelerator (hardware accelerator 135-2).

Endpoint 145-2 is capable of receiving the task offloaded from host processor 105 via interface circuitry 115. In one or more embodiments, host processor 105, by way of executing runtime 172 and driver 174, is capable of viewing hardware accelerators 135 as a unified address space. Endpoint 145-2 may provide the task (e.g., data) to compute unit 160-2. The task may specify a target address within memory 140-3 from which compute unit 160-2 is to retrieve data for performing the offloaded task. Hardware accelerator 135-2, using link circuit 150-2, is able to initiate and perform the data transfer directly with hardware accelerator 135-3 by way of the accelerator link established between link circuit 150-2 and link circuit 150-3.

While the data transfer may be initiated by host processor 105, the data transfer is performed using link circuits 150 and occurs without involving host processor 105, host memory 110, or interface circuitry 115. The data transfer occurs directly between the hardware accelerators. In conventional systems, the data transfer would occur by host processor 105 retrieving the data from hardware accelerator 135-3 via interface circuitry 115 and then providing the data to hardware accelerator 135-2 via interface circuitry 115.

The ability of hardware accelerators 135 to read and write data among themselves without having that data travel through host processor 105 significantly reduces the amount of data passed over interface circuitry 115 (e.g., the PCIe bus). This saves considerable bandwidth of interface circuitry 115 for use in conveying data between host processor 105 and other hardware accelerators 135. Further, the speed of operation of system 100 may be increased due to the reduction in the time required for hardware accelerators 135 to share data.

System 100 may include fewer components than shown or additional components not illustrated in FIG. 1 depending upon the particular type of device and/or system that is implemented. In addition, the particular operating system, application(s), and/or I/O devices included may vary based upon system type. Further, one or more of the illustrative components may be incorporated into, or otherwise form a portion of, another component. For example, a processor may include at least some memory. System 100 may be used to implement a single computer or a plurality of networked or interconnected computers each implemented using the architecture of FIG. 1 or an architecture similar thereto.

Figure 2:
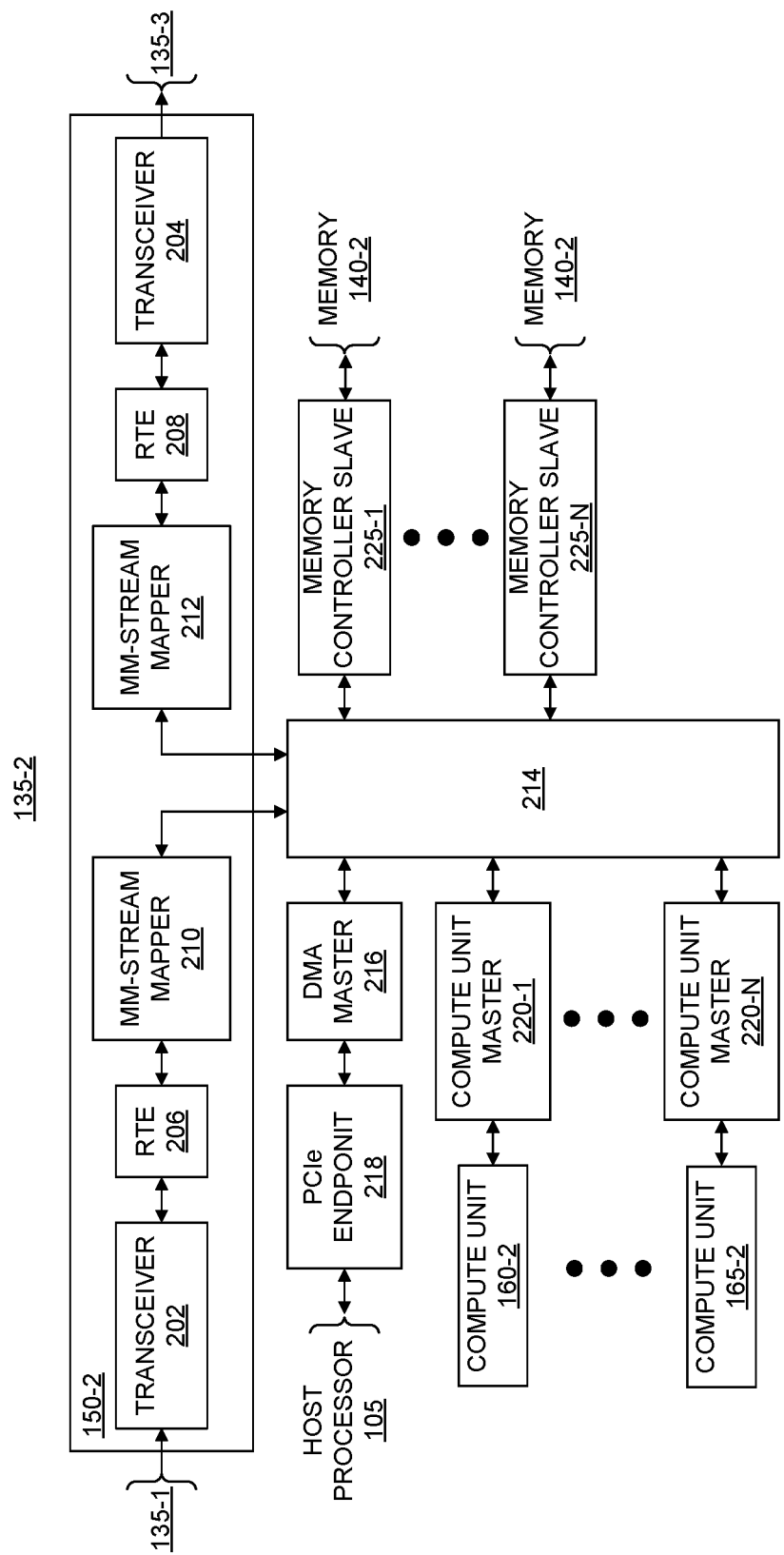
FIG. 2 illustrates an example implementation of a hardware accelerator.

FIG. 2 illustrates an example implementation of hardware accelerator 135-2 of FIG. 1. Within FIG. 2, an example implementation of link circuit 150-2 is provided. It should be appreciated that the architecture illustrated for link circuit 150-2 in FIG. 2 may be used to implement any of the link circuits 150 illustrated in FIG. 1.

In one or more embodiments, link circuit 150-2 is capable of converting transactions that are to be sent to other hardware accelerators into data stream based packets and route the packets over the accelerator links established among link circuits 150. In particular embodiments, link circuit 150-2 is capable of converting AMBA eXtensible Interface (AXI) compliant memory mapped transactions into AXI data streams for transmission. Within this disclosure, AXI is used as an example communication protocol. It should be appreciated that other communication protocols may be used. In this regard, use of AXI is intended for purposes of illustration and not limitation. Link circuit 150-2 is also capable of handling incoming packets from other hardware accelerators (e.g., hardware accelerators 135-1 and 135-3), convert the packets into memory mapped transactions, and route the data locally within hardware accelerator 135-2. Further, link circuit 150-2 is capable of converting received packets into memory mapped transactions, modifying the transaction, converting the memory mapped transaction into packets, and passing the packets to a next hardware accelerator. Data received via the accelerator links may be routed internally within hardware accelerator 135-2 as memory mapped transactions.

In the example of FIG. 2, link circuit 150-2 includes transceivers 202 and 204, retransmit engines (RTEs) 206 and 208, and memory map to stream (MM-stream) mappers 210 and 212. MM-stream mappers 210 and 212 are coupled to interconnect circuitry 214.

As pictured, transceiver 202 may be coupled to a corresponding transceiver in hardware accelerator 135-1, while transceiver 204 is coupled to a corresponding transceiver in hardware accelerator 135-3. Transceivers 202 and 204 implement a physical layer of the accelerator links established with other hardware accelerators. Each of transceivers 202 and 204 is capable of implementing a lightweight, serial communications protocol for multi-gigabit communication links. In one or more embodiments, each of transceivers 202 and 204 is capable of implementing a bi-directional interface to a transceiver in a neighboring IC. Transceivers 202 and 204 are capable of automatically initializing the accelerator links with the other hardware accelerators. In general, transceivers 202 and 204 are capable of bi-directional communication to implement low level signaling and low PHY level protocols relating to flow control. Data flows, however, are implemented using a ring topology and flow from master to slave (e.g., in a single direction around the ring) as previously described.

For example, transceiver 202 is capable of communicating bi-directionally with a corresponding transceiver within link circuit 150-1 of hardware accelerator 135-1. Transceiver 204 is capable of communicating bi-directionally with a corresponding transceiver within link circuit 150-3 of hardware accelerator 135-3. Each of transceivers 202 and 204 is capable of communicating with a neighboring transceiver using data streams, e.g., AXI data streams.

In particular embodiments, transceivers 202 and 204 are capable of sending and receiving data to a neighboring hardware accelerator using 8B/10B coding rules. Each of transceivers 202 and 204 is capable of detecting single-bit and most multi-bit errors using the 8B/10B coding rules.

In one or more embodiments, each of transceivers 202 and 204 is implemented as an Aurora 8B/10B IP Core, which is available from Xilinx, Inc. of San Jose, Calif. It should be appreciated, however, that the particular core noted is provided for purposes of illustration and is not intended as a limitation. Other transceivers that are capable of operating as described herein may be used.

Transceiver 202 is coupled to RTE 206. Transceiver 202 and RTE 206 are capable of communicating through a plurality of data streams running in each direction supporting bidirectional communication. Transceiver 204 is coupled to RTE 208. Transceiver 204 and RTE 208 are capable of communicating through a plurality of data streams running in each direction supporting bidirectional communication.

RTEs 206 and 208 are capable of managing transactions. In one or more embodiments, RTE 206 and RTE 208 each implements additional layers of communication protocol upon those implemented by transceivers 202 and 204, respectively. For example, RTE 206 and RTE 208 each implement a transaction layer (TL)/Link Layer (LL) and a user layer. These additional layers provide extra assurance regarding data integrity. After initialization, applications are able to pass data across the accelerator links as streams of data. The additional data integrity measures are particularly beneficial since control signals are merged with data when converting memory mapped transactions to stream data. A data integrity issue may result in corrupt control signals. On-chip interconnects and/or buses are intolerant of data loss with respect to the control signals.

The TL/LL implements a token based flow control to guarantee lossless data communication. In one or more embodiments, the communication channels between neighboring transceivers and between transceivers and RTEs are 128 bits in width. When sending data, each RTE is capable of checking that the receiving link circuit in the target hardware accelerator has sufficient buffering resources (e.g., a token) for receiving the entire transaction to be sent before actually sending the transaction to the physical layer implemented by the transceiver. For example, RTE 206 may check that receiving link circuit 150-1 in hardware accelerator 135-1 has sufficient buffer resources for receiving data prior to providing the data to transceiver 202 (within link circuit 150-2) for sending.

RTEs 206 and 208 are capable of detecting data corruption. For example, each of RTEs 206 and 208 is capable of verifying packet length information, packet sequence information, and/or the Cyclic Redundancy Check (CRC) checksum for each packet that is received. When an RTE slave (e.g., receiving RTE) detects a packet error, the RTE may enter an error abort mode. In the error abort mode, the RTE drops the packet with the error as a failed packet. The RTE further drops all subsequent packets of the transaction. In particular embodiments, initiation of the error abort mode causes the RTE to launch a link retry sequence. Once the link retry sequence is successful, the link master (e.g., sending RTE) is able to re-cover the transmission by starting from the failing point.

RTE 206 is coupled to MM-stream mapper 210. RTE 206 is capable of communicating with MM-stream mapper 210 via a plurality data streams running in each direction supporting bidirectional communication. RTE 208 is coupled to MM-stream mapper 212. RTE 208 is capable of communicating with MM-stream mapper 212 via a plurality data streams running in each direction supporting bidirectional communication.

Each of MM-stream mapper 210 and MM-stream mapper 212 is coupled to interconnect circuitry 214. Interconnect circuitry 214 is capable of routing data among the MM-stream mappers 210 and 212 as well as other master and/or slave circuits of hardware accelerator 135-2 coupled thereto. Interconnect circuitry 214 may be implemented as one or more on-chip interconnects. An example of an on-chip interconnect is an AXI bus. An AXI bus is an embedded microcontroller bus interface for use in establishing on-chip connections between circuit blocks and/or systems. Other example implementations of interconnect circuitry may include, but are not limited to, other buses, cross-bars, network on chips (NoCs), and so forth.

MM-stream mappers 210 and 212 are capable of converting received data streams from RTEs 206 and 208, respectively, to memory mapped transactions that may be provided to interconnect circuit block 214. In this regard, the data stream may be demultiplexed into multiple channels supporting memory mapped transactions. MM-stream mappers 210 and 212 are also capable of converting received memory mapped transactions from interconnect circuit block 214 to stream data that may be provided to RTE 206 and 208, respectively. MM-stream mappers 210 and 212 are capable of multiplexing multiple channels supporting memory mapped transactions (e.g., including control signals as discussed) into a single data stream for sending to RTEs 206 and 208, respectively.

In one or more embodiments, each of MM-stream mappers 210 and 212 is capable of adjusting a target address received in a transaction. MM-stream mapper 210, for example, in receiving a transaction from hardware accelerator 135-1 via an accelerator link may subtract an upper bound of the address range for hardware accelerator 135-2 (e.g., the address range of memory 140-2) from the target address of the transaction. By adjusting the target address as the transaction passes through link circuits 150, a transaction may be directed from one hardware accelerator to another via the accelerator links. Further details relating to the operation of addresses in using the accelerator links are described in greater detail in connection with FIG. 4.

For purposes of illustration, other portions of hardware accelerator 135-2 are described in relation to link circuit 150-2. In the example of FIG. 2, interconnect circuitry 214 is coupled to a direct memory access (DMA) master circuit 216. DMA master circuit 216, for example, includes a memory mapped interface for communicating with interconnect circuit block 214. DMA master circuit 216 is coupled to PCIe endpoint 218. PCIe endpoint 218, which is an example implementation of endpoint 145-2 of FIG. 1, is communicatively linked to host processor 105.

In the example of FIG. 2, interconnect circuitry 214 is also coupled to one or more compute unit masters 220-1 through 220-N. Each compute unit master 220 provides a bidirectional interface between a compute unit implemented within hardware accelerator 135-2 and interconnect circuit block 214. Each compute unit master 220 further includes a memory mapped interface for communicating with interconnect circuit block 214. Each of compute unit 160-2 and compute unit 165-2 may be connected to interconnect circuitry 214 via a slave interface (not shown).

In the example of FIG. 2, interconnect circuitry 214 is also coupled to one or more memory controller slave circuits 225-1 through 225-N. Each memory controller slave circuit 225 facilitates read and write operations for memory 140-2. Memory 140-2 may be implemented as one or more off-chip memories accessible by hardware accelerator 135-2. Each of memory controllers 225-1 through 225-N further includes a memory mapped interface for communicating with interconnect circuit block 214.

Figure 3:
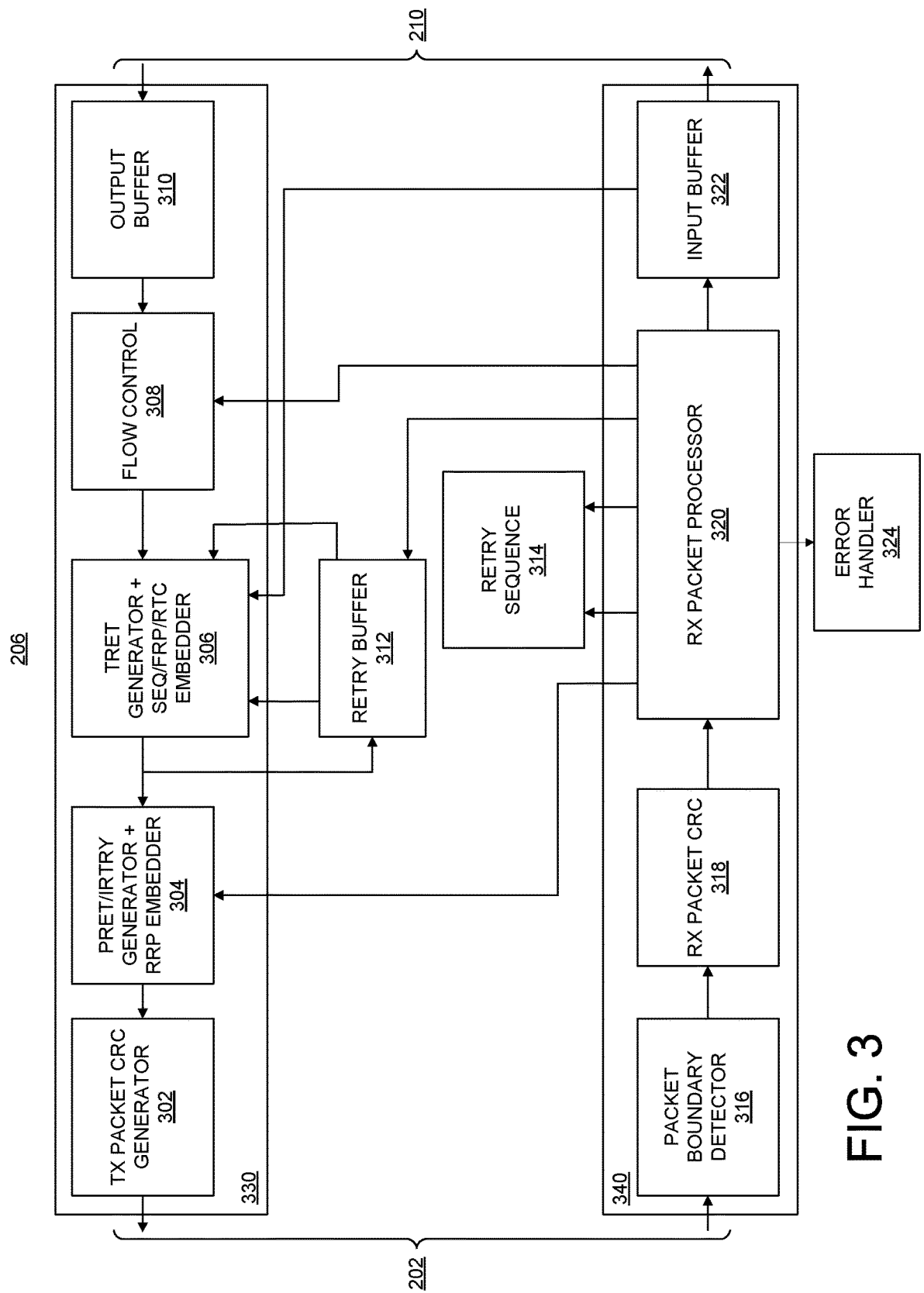
FIG. 3 illustrates an example of a retransmit engine (RTE).

FIG. 3 illustrates an example implementation of RTE 206. The example architecture described in connection with FIG. 3 implements a credit-based flow control/retransmission control scheme using Flow Control Units (FLITs). RTE 206 is capable of translating between FLIT-based protocol and/or interface used internally to a protocol and/or interface that may be used by applications.

RTE 206 includes a transmit channel 330. Transmit channel 330 is capable of decapsulating data (e.g., AXI) streams into FLIT-based transactions. In the example of FIG. 3, transmit channel 330 includes a transmit (TX) packet Cyclic Redundancy Check (CRC) generator 302, a Retry Pointer Return Command (PRET) Packet/Init Retry Command (IRTRY) Packet Generator and Return Retry Pointer (RRP) embedder 304, a Token Return (TRET) packet generator and Sequence (SEQ) number/Forward Retry Pointer (FRP)/Return Token Count (RTC) embedder 306, a flow control circuit 308, and an output buffer 310. TRET generator and SEQ/FRP/RTC embedder 306 is also coupled to retry buffer 312.

RTE 206 includes a receive channel 340. Receive channel 340 is capable of encapsulating a FLIT-based interface and converting the interface into data (e.g., AXI) streams. In the example of FIG. 3, receive channel 340 includes a packet boundary detector 316, a receive (RX) packet CRC circuit 318, an RX packet processor 320, and an input buffer 322. Rx packet processor 320 is coupled to error handler 324 and to retry sequence circuit 314.

RTE 206 is provided for purposes of illustration and not limitation. It should be appreciated that other architectures suitable for implementing a credit-based flow control/retransmission control scheme may be used. The architecture described in connection with FIG. 3 may also be used to implement RTE 208 of FIG. 2 with a flipped or reversed orientation in terms of data flow.

Figure 4:
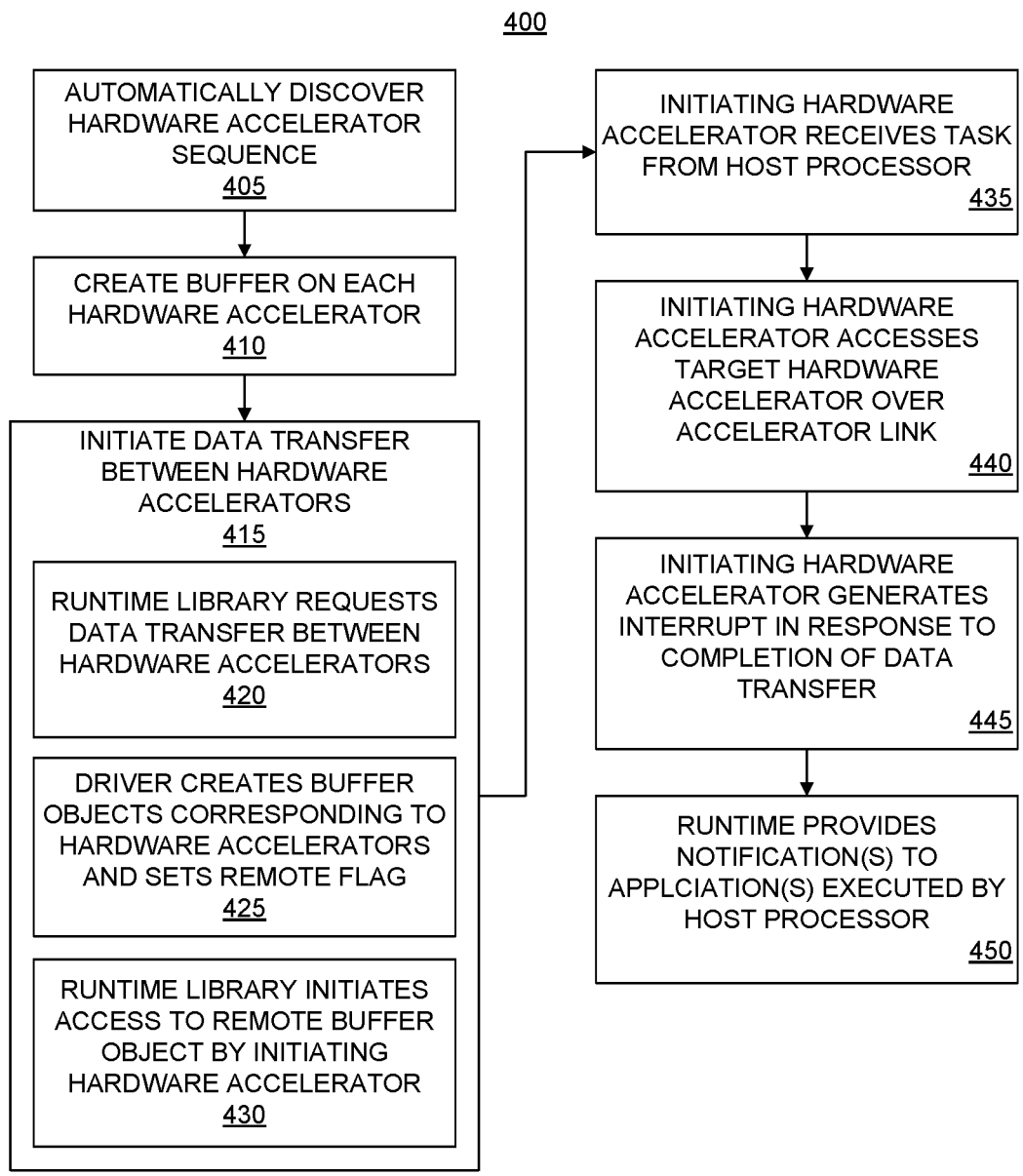
FIG. 4 illustrates an example method of operation for a system with multiple hardware accelerators.

FIG. 4 illustrates an example method 400 of operation for a system with a plurality of hardware accelerators. Method 400 illustrates an example of data transfer directly among the hardware accelerators. Method 400 may be performed by a system the same as, or similar to, system 100 described in connection with FIG. 1. Method 400 illustrates how insufficient bandwidth on the bus coupling the host processor and the hardware accelerators may be alleviated. Data transfers that otherwise occur on the bus may be diverted to the accelerator links thereby freeing bandwidth on the bus for other operations.

In block 405, the system is capable of automatically discovering the hardware accelerator sequence. In one or more embodiments, the hardware accelerators, e.g., boards of the hardware accelerators, are arranged in a ring topology within the system. The host processor is aware of the existing PCIe topology and, as such, the number of hardware accelerators that exist within the system coupled to the PCIe bus. Further, the host processor, e.g., by way of the runtime, is aware of the particular circuitry (e.g., image or configuration bitstream) loaded into each hardware accelerator. As such, the host processor is aware that the hardware accelerators support accelerator links as described herein. The host processor still must determine the sequence of hardware accelerators. The driver, for example, is capable of performing the automatic discovery of the hardware accelerator sequence described. This automatic discovery capability supports the addition of new and/or additional hardware accelerators to the system without having to modify the applications executed by the host processor.

Each hardware accelerator may have a known and same address range. For example, each hardware accelerator may be assumed to have an address range of 16 GB corresponding to 16 GB of memory 140. In one or more embodiments, the host processor is capable of writing a unique value to memory addresses at 16 GB intervals. The host processor may then read back the values to determine the sequence of hardware accelerators within the ring topology based upon the written and read values.

In block 410, the host processor is capable of creating a buffer on each hardware accelerator at start up. For example, the runtime executed by the host processor is capable of communicating with each hardware accelerator to create a buffer within the memory of each respective hardware accelerator. Referring to FIG. 1, hardware accelerator 135-1 creates a buffer within memory 140-1. Hardware accelerator 135-2 creates a buffer within memory 140-2. Hardware accelerator 135-3 creates a buffer within memory 140-3.

In block 415, the host processor initiates a data transfer between hardware accelerators. The data transfer, for example, may be part of a task that is to be offloaded from the host processor to a hardware accelerator. As an illustrative and nonlimiting example, host processor 105 may offload a task for an application to compute unit 160-1 of hardware accelerator 135-1. The task may include instructions and a target address from which compute unit 160-1 is to obtain data for the task. The target address in this example is located in hardware accelerator 135-2 (e.g., in memory 140-2). Accordingly, to perform the task offloaded from the host processor, compute unit 160-1 must retrieve the data from the target address in memory 140-2.

In block 420, the runtime may request a data transfer between hardware accelerators 135-1 and 135-2. For example, the runtime may request a read of hardware accelerator 135-2 by, or from, hardware accelerator 135-1.

In block 425, the driver is capable of creating a buffer object in the host memory corresponding to hardware accelerator 135-2 and a buffer object in the host memory corresponding to hardware accelerator 135-1. A buffer object is a shadow data structure implemented in host memory. Each buffer object may correspond to, or represent, a device in the system. A buffer object may include data that supports administrative functions performed by the runtime executed by the host processor.

In one or more embodiments, buffer objects created in the host memory may include a remote flag. The remote flag may be set to indicate that the buffer object is remote from the perspective of the hardware accelerator that is initiating a transaction. In this example, hardware accelerator 135-1 is reading data from hardware accelerator 135-2. As such, hardware accelerator 135-1 is initiating the transaction. The driver sets the remote flag in the buffer object corresponding to hardware accelerator 135-2 upon creation.

In block 430, the runtime library initiates access to the buffer object (e.g., remote buffer object) by the initiating hardware accelerator. The runtime library initiates access of the buffer object corresponding to hardware accelerator 135-2 from hardware accelerator 135-1. For example, the runtime determines that the remote flag is set within the buffer object for hardware accelerator 135-2. In response to determining that the remote flag is set, the runtime library schedules the transfer using the accelerator links established by the link circuits. In scheduling the transfer using the accelerator links between the hardware accelerators, the runtime determines the address to be used by hardware accelerator 135-1 to access the data from hardware accelerator 135-2.

For purposes of illustration, consider an example where each of hardware accelerators 135 has an address range of 1-1000. In such an example, the runtime may determine that the data to be retrieved from hardware accelerator 135-2 by hardware accelerator 135-1 is located in a buffer at address 500 corresponding to hardware accelerator 135-2 (e.g., at address 500 corresponding to memory 140-2). In this example, the runtime adds 1000 to the target address resulting in an address of 1500, which is provided to hardware accelerator 135-1 as the target address for reading data upon which to operate for the offloaded task.

As another example, if the data were stored at address 500 within memory 140-3, the runtime would add 2000, assuming each of hardware accelerators 135 has an address range of 1-1000, in order for the transaction to reach hardware accelerator 135-3. In general, as known, return path data may be tracked through the on-chip bus interconnects (e.g., AXI interconnects) used. When a read request from a master is issued, for example, the read request is routed to the slave through the interconnects with a series of address decoding and/or address shifting (performed by the mm-stream mappers) as the read request traverses across each hardware accelerator. Each individual interconnect is capable of keeping track of which masters have outstanding transactions to each slave. Upon the read data being returned, the read data may be sent back over the correct interface(s). In some cases, identifier (ID) bits may be used to associate particular read data back with a particular master in order to return the read data.

In block 435, the initiating hardware accelerator (e.g., the first hardware accelerator) receives the task from the host processor. End point 145-1, for example, may receive the task and provide the task to compute unit 160-1. The task specifies that the data to be operated on by compute unit 160-1 is located at the target address, which is 1500 in this example. Compute unit 160-1, for example, may have a control port to which the target address may be stored. In attempting to access the data located at address 1500, compute unit 160-1 recognizes that the address is not within the range of hardware accelerator 135-1. For example, compute unit 160-1 is capable of comparing the address with the upper bound of the address range of 1000 and determining that the address exceeds the upper bound. In this example, compute unit 160-1 is capable of initiating a read transaction from address 1500. For example, compute unit 160-1 may initiate the read transaction as a memory mapped transaction sent over interconnect 214.

In block 440, the initiating hardware accelerator accesses the target hardware accelerator (e.g., the second hardware accelerator) over the accelerator link. For example, link circuit 150-1 is capable of converting the memory mapped transaction initiated by compute unit 160-1 into stream based packets (e.g., using the MM-stream mapper). Link circuit 150-1 is further capable of encoding the packets with additional data supporting data integrity checking, retransmitting, initialization, and error reporting (e.g., using the RPE). The ring topology may master from left to right. As such, the packets may be output by the transceiver of link circuit 150-1 to link circuit 150-2.

Link circuit 150-2 receives the data stream in transceiver 202 and processes the transaction in RTE 206. MM-stream mapper 210, in response to receiving the stream data based packets, is capable of performing a variety of operations. MM-stream mapper 210, for example, is capable of converting the stream based packets into a memory mapped transaction. Further, MM-stream mapper 210 is capable of decrementing the target address of 1500 by the upper bound of the address range of hardware accelerator 135-2. As noted, the upper bound may be stored in a table or register within link circuit 150-2, e.g., in MM-stream mapper 210. In this example, MM-stream mapper 210 decrements the target address of 1500 by 1000 resulting in a target address of 500. Since the target address is local to hardware accelerator 135-2, hardware accelerator 135-2 is capable of acting on the received transaction. In this example, MM-stream mapper 210 provides the memory mapped transaction to interconnect 214. The memory mapped transaction may be provided to memory controller 155-2 (e.g., through a memory controller slave) to perform the read transaction. In this manner, hardware accelerator 135-1 is capable of reading data from (or writing data to) hardware accelerator 135-2. The requested data may be provided from memory 140-2 back to the requestor using the same path used to send the read request. For example, the data read from memory 140-2 is sent from hardware accelerator 135-2 to hardware accelerator 135-1 without having to traverse forward through the ring topology to hardware accelerator 135-3 and then to hardware accelerator 135-1.

If, for example, the target address was 2500, the result of decrementing would be 1500. In that case, MM-stream mapper 210 determines that the target address is not located in hardware accelerator 135-2 since the target address is larger than the upper bound of the address range (e.g., 1000) for hardware accelerator 135-2. In that case, MM-stream mapper 210 may send the transaction through the interconnect circuitry to MM-stream mapper 212 to forward on to the next hardware accelerator.

In block 445, compute unit 160-1 in hardware accelerator 135-1 is capable of generating an interrupt to the host processor informing the host processor that the data transfer between the hardware accelerators is complete. In block 450, the runtime is capable of providing any notifications necessary to applications that the data transfer is complete. The runtime, for example, is capable of handling completion events, command queues, and notifications to applications.

In one or more embodiments, the PCIe endpoint and DMA master are capable of writing to a target address that is located in a different hardware accelerator. As an illustrative and non-limiting example, the host processor may send data to hardware accelerator 135-1 with a target address that is located in hardware accelerator 135-2. In that case, the DMA master is capable of recognizing that the target address is located in a different hardware accelerator and schedule the data transfer over the accelerator link. For example, the DMA master may compare the target address with the upper bound of the address range for hardware accelerator 135-1. In response to determining that the target address exceeds the upper bound, the DMA master is capable of initiating a memory mapped transaction over the interconnect circuitry to MM-stream mapper 212 in link circuit 150-1 for sending to hardware accelerator 135-2 via the accelerator link.

In one or more embodiments, the host processor is capable of using accelerator links for purposes of load balancing. For example, the host processor is capable of using the runtime to determine the status of the DMA channels (e.g., DMA master) in a selected hardware accelerator to which data is to be provided or a task is to be offloaded. In response to determining that the DMA master is busy or operating above a threshold amount of activity, the host processor may send the data to a different hardware accelerator via the bus. The data may specify a target address within the selected hardware accelerator. The DMA master within the receiving hardware accelerator, upon receiving the data from the host processor, is capable of forwarding the data to the selected hardware accelerator over the accelerator link(s). In particular embodiments, the host processor is capable of choosing the receiving hardware accelerator based upon a determination that the DMA master therein is not busy or is operating below the threshold amount of activity.

For purposes of illustration, an example of a write transaction from hardware accelerator 135-1 to hardware accelerator 135-3 is generally described as initiated by the host processor. The host processor, by way of the runtime and driver, sets the remote flag for the target hardware accelerator and determines an address of 2500 (using the prior example where the desired address is located at address 500 in hardware accelerator 135-3). The host processor provides instructions to hardware accelerator 135-1 to write to address 2500. Within hardware accelerator 135-1, the transaction with an address of 2500 is presented to interconnect 214. Since the address exceeds the upper limit of hardware accelerator 135-1, interconnect 214 sends the transaction to link circuit 150-1. Link circuit 150-1 sends the transaction to link circuit 150-2. The MM-stream mapper in hardware accelerator 135-2 decrements the address by 1000 resulting in a new address of 1500. The new address is still remote as 1500 exceeds the upper address bound of hardware accelerator 135-2. As such, the transaction is forwarded to hardware accelerator 135-3.

The MM-stream mapper in hardware accelerator 135-3 decrements the address resulting in a new address of 500. The transaction is then provided, via interconnect 214 in hardware accelerator 135-3, to a memory controller and the data written to memory 140-3. In the examples described, the address is used by each hardware accelerator to determine whether the transaction can be serviced by the hardware accelerator and, if so, where to route the transaction internally (e.g., to a memory controller or other circuit block), or should be forwarded to the next hardware accelerator. In particular embodiments, the address is different from the actual address to which the data is written in memory. The write acknowledgement is sent, as described, from hardware accelerator 135-3 through hardware accelerator 135-2 to hardware accelerator 135-1.

For purposes of illustration, another example of a read transaction initiated by hardware accelerator 135-1 to hardware accelerator 135-3 is generally described as initiated by the host processor. The host processor, by way of the runtime and driver, sets the remote flag for the target hardware accelerator and determines an address of 2500 (using the prior example where the desired address is located at address 500 in hardware accelerator 135-3). The host processor provides instructions to hardware accelerator 135-1 to read from address 2500. Within hardware accelerator 135-1, the transaction with an address of 2500is presented to interconnect 214. Since the address exceeds the upper limit of hardware accelerator 135-1, interconnect 214 sends the transaction to link circuit 150-1. Link circuit 150-1 sends the transaction to link circuit 150-2. The MM-stream mapper in hardware accelerator 135-2 decrements the address by 1000 resulting in a new address of 1500. The new address is still remote as 1500 exceeds the upper address bound of hardware accelerator 135-2. As such, the transaction is forwarded to hardware accelerator 135-3.

The MM-stream mapper in hardware accelerator 135-3 decrements the address resulting in a new address of 500. The transaction is then provided, via interconnect 214 in hardware accelerator 135-3 to a memory controller and the data read from memory 140-3. In the examples described, the address is used by each hardware accelerator to determine whether the transaction can be serviced by the hardware accelerator and, if so, where to route the transaction internally, or should be forwarded to the next hardware accelerator. In particular embodiments, the address is different from the actual address from which the data is read from memory. The data that is read is sent, as described, from hardware accelerator 135-3 through hardware accelerator 135-2 to hardware accelerator 135-1.

Figure 5:
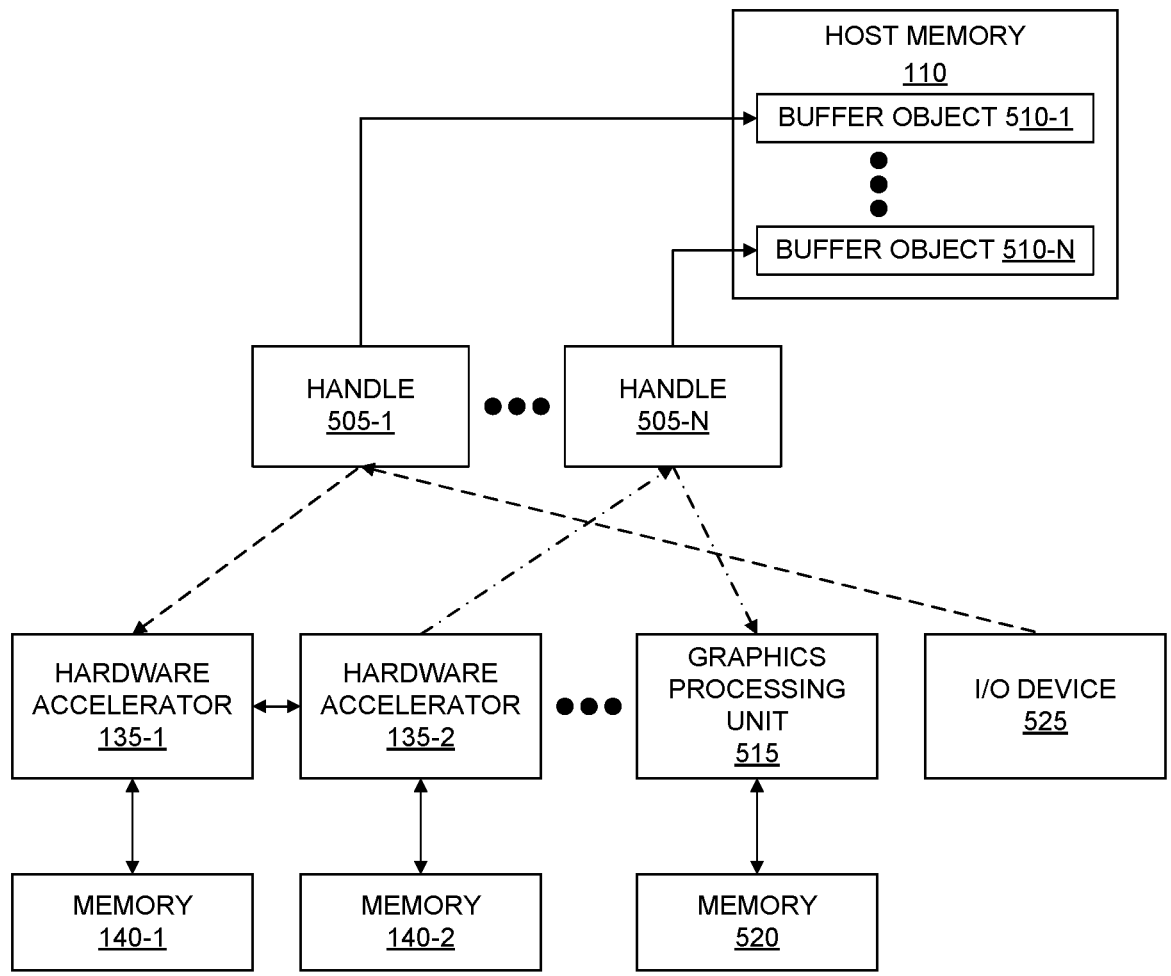
FIG. 5 illustrates an example of a system with multiple hardware accelerators and one or more additional devices.

FIG. 5 illustrates an example of a system including hardware accelerators and one or more additional devices. In the example of FIG. 5, hardware accelerators 135-1 and 135-2 are shown and are coupled by an accelerator link using the link circuit in each respective hardware accelerator. For purposes of illustration, hardware accelerator 135-3 is not shown. The system also includes a GPU 515, which is coupled to memory 520, and an I/O device 525.

In the example of FIG. 5, GPU 515 may write data to hardware accelerator 135-2 or read data from hardware accelerator 135-2. In this example, the host processor (not shown) provides handle 505-N to GPU 515. In particular embodiments, handles may be implemented as file descriptors. Handle 505-N may point to a buffer object 510-N, which corresponds to hardware accelerator 135-2. By GPU 515 using handle 505-N for the read or write operation, the host processor initiates action on a buffer object corresponding to handle 505-N, e.g., buffer object 510-N. The host processor determines whether buffer object 510-N is local or remote. The host processor may retrieve the data from memory 140-2 over PCIe and provide the data to GPU 515 over PCIe since the remote flag in buffer object 510-N is not set.

In one or more other embodiments, the host processor may initiate retrieval of data from memory 140-2 by accessing a different hardware accelerator. For example, the host processor may initiate communication via PCIe with hardware accelerator 135-1 to retrieve data from memory 140-2. In that case, hardware accelerator 135-1 may communicate directly with hardware accelerator 135-2 using the link circuits to retrieve data from memory 140-2. Hardware accelerator 135-1 may then provide the data back to the host processor, which in turn provides the data to GPU 515 over PCIe.

In another example, I/O device 525, e.g., a camera, may write data to hardware accelerator 135-1. In that case, the host processor is capable of providing handle 505-1 to I/O device 525. Handle 505-1 may point to a buffer object 510-1, which corresponds to hardware accelerator 135-1. By I/O device 525 using handle 505-1 for the write operation, the host processor initiates action on a buffer object corresponding to handle 505-1, e.g., buffer object 510-1. The host processor determines whether buffer object 510-1 is local or remote. The host processor may receive data from I/O device 525 and provide such data over PCIe to hardware accelerator 135-1 for writing in memory 140-1 and/or further processing since the remote flag in buffer object 510-1 is not set.

In one or more embodiments, the driver is capable of setting the remote flag within a buffer object only in cases of data transfers between hardware accelerators that are capable of using accelerator links as described. FIG. 5 illustrates that while other types of devices may be used with hardware accelerators, data transfers between such other devices and the hardware accelerators occur over the bus and involve the host processor.

Figure 6:
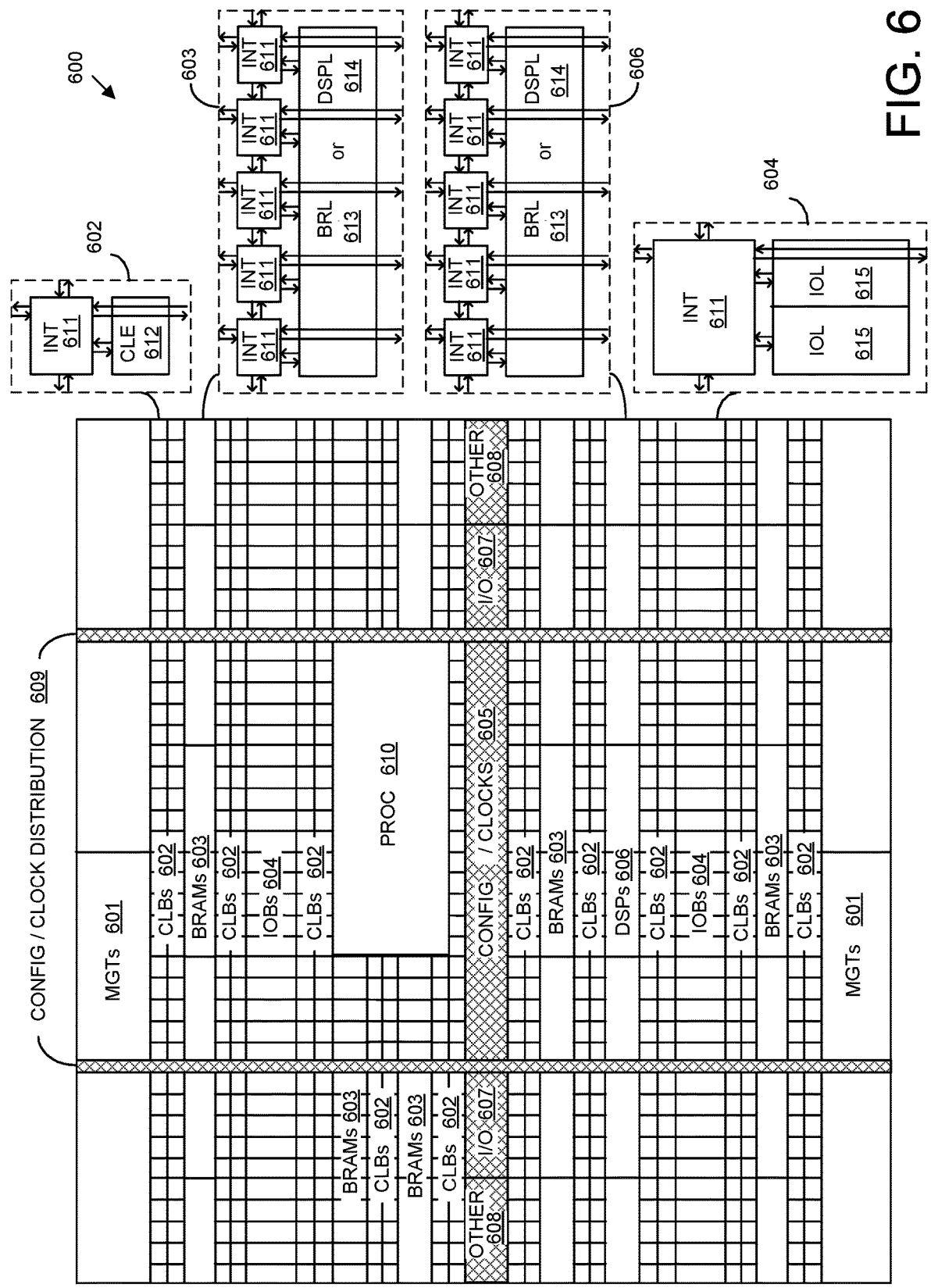
FIG. 6 illustrates an example architecture for an integrated circuit (IC).

FIG. 6 illustrates an example architecture 600 for an IC. In one aspect, architecture 600 may be implemented within a programmable IC. For example, architecture 600 may be used to implement a field programmable gate array (FPGA). Architecture 600 may also be representative of a system-on-chip (SOC) type of IC. An SOC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 600 includes several different types of programmable circuit, e.g., logic, blocks. For example, architecture 600 may include a large number of different programmable tiles including multi-gigabit transceivers (MGTs) 601, configurable logic blocks (CLBs) 602, random access memory blocks (BRAMs) 603, input/output blocks (IOBs) 604, configuration and clocking logic (CONFIG/CLOCKS) 605, digital signal processing blocks (DSPs) 606, specialized I/O blocks 607 (e.g., configuration ports and clock ports), and other programmable logic 608 such as digital clock managers, analog-to-digital converters, system monitoring logic, and so forth.

In some ICs, each programmable tile includes a programmable interconnect element (INT) 611 having standardized connections to and from a corresponding INT 611 in each adjacent tile. Therefore, INTs 611, taken together, implement the programmable interconnect structure for the illustrated IC. Each INT 611 also includes the connections to and from the programmable logic element within the same tile, as shown by the examples included at the top of FIG. 6.

For example, a CLB 602 may include a configurable logic element (CLE) 612 that may be programmed to implement user logic plus a single INT 611. A BRAM 603 may include a BRAM logic element (BRL) 613 in addition to one or more INTs 611. Typically, the number of INTs 611 included in a tile depends on the height of the tile. As pictured, a BRAM tile has the same height as five CLBs, but other numbers (e.g., four) also may be used. A DSP tile 606 may include a DSP logic element (DSPL) 614 in addition to an appropriate number of INTs 611. An 10B 604 may include, for example, two instances of an I/O logic element (IOL) 615 in addition to one instance of an INT 611. The actual I/O pads connected to IOL 615 may not be confined to the area of IOL 615.

In the example pictured in FIG. 6, a columnar area near the center of the die, e.g., formed of regions 605, 607, and 608, may be used for configuration, clock, and other control logic. Horizontal areas 609 extending from this column may be used to distribute the clocks and configuration signals across the breadth of the programmable IC.

Some ICs utilizing the architecture illustrated in FIG. 6 include additional logic blocks that disrupt the regular columnar structure making up a large part of the IC. The additional logic blocks may be programmable blocks and/or dedicated circuitry. For example, a processor block depicted as PROC 610 spans several columns of CLBs and BRAMs.

In one aspect, PROC 610 may be implemented as dedicated circuitry, e.g., as a hardwired processor, that is fabricated as part of the die that implements the programmable circuitry of the IC. PROC 610 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 610 may be omitted from architecture 600 and replaced with one or more of the other varieties of the programmable blocks described. Further, such blocks may be utilized to form a "soft processor" in that the various blocks of programmable circuitry may be used to form a processor that can execute program code as is the case with PROC 610.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 6 that are external to PROC 610 such as CLBs 602 and BRAMs 603 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 610.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SOC, the configuration bitstream may specify the circuitry that is to be implemented within the programmable circuitry and the program code that is to be executed by PROC 610 or a soft processor. In some cases, architecture 600 includes a dedicated configuration processor that loads the configuration bitstream to the appropriate configuration memory and/or processor memory. The dedicated configuration processor does not execute user-specified program code. In other cases, architecture 600 may utilize PROC 610 to receive the configuration bitstream, load the configuration bitstream into appropriate configuration memory, and/or extract program code for execution.

FIG. 6 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 6 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 610 within the IC are for purposes of illustration only and are not intended as limitations.

Architecture 600 may be used to implement a hardware accelerator as described herein. In particular embodiments, one or more or each of the endpoint, link circuit, and memory controller may be implemented as hardwired circuit blocks. In particular embodiments, one or more or each of the endpoint, link circuit, and memory controller may be implemented using programmable circuitry. In still other embodiments, one or more of the noted circuit blocks may be implemented as hardwired circuit blocks while the others are implemented using programmable circuitry.

The embodiments described within this disclosure may be used in any of a variety of applications such as, for example, database acceleration, processing multiple video stream, real time network traffic monitoring, machine learning, or any other application that may involve multiple hardware accelerators.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the term "approximately" means nearly correct or exact, close in value or amount but not precise.

For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), an FPGA, a programmable logic array (PLA), an ASIC, programmable logic circuitry, and a controller.

As defined herein, the term "output" means storing in physical memory elements, e.g., devices, writing to display or other peripheral output device, sending or transmitting to another system, exporting, or the like.

As defined herein, the term "real time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in 1.

In one or more embodiments, a system may include a host processor coupled to a communication bus, a first hardware accelerator communicatively linked to the host processor through the communication bus, and a second hardware accelerator communicatively linked to the host processor through the communication bus. The first hardware accelerator and the second hardware accelerator are directly coupled through an accelerator link independent of the communication bus. The host processor is configured to initiate a data transfer between the first hardware accelerator and the second hardware accelerator directly through the accelerator link.

In one aspect, the host processor is configured to communicate with the first hardware accelerator and the second hardware accelerator over the communication bus.

In another aspect, the data transfer includes the first hardware accelerator accessing a memory of the second hardware accelerator through the accelerator link.

In another aspect, the host processor is configured to access the memory of the second hardware accelerator by sending data including a target address to the first hardware accelerator, wherein the target address is translated by the host processor to correspond to the second hardware accelerator, and wherein the first hardware accelerator initiates a transaction to access the memory of the second hardware accelerator over the accelerator link based upon the target address.

In another aspect, the second hardware accelerator is configured to decrement a target address for the data transfer by an upper bound of an address range for the second hardware accelerator in response to receiving a transaction via the accelerator link and determine whether the decremented target address is local.

In another aspect, the host processor is configured to initiate the data transfer between the first hardware accelerator and the second hardware accelerator based on a status of a direct memory access circuit of the second hardware accelerator coupled to the communication bus.

In another aspect, the host processor is configured to automatically determine a sequence of the first hardware accelerator and the second hardware accelerator in a ring topology.

In another aspect, the host processor is configured to track buffers corresponding to the first hardware accelerator and the second hardware accelerator using remote buffer flags.

In one or more embodiments, a hardware accelerator may include an endpoint configured to communicate with a host processor over a communication bus, a memory controller coupled to a memory local to the hardware accelerator, and a link circuit coupled to the endpoint and the memory controller. The link circuit is configured to establish an accelerator link with a target hardware accelerator also coupled to the communication bus. The accelerator link is a direct connection between the hardware accelerator and the target hardware accelerator that is independent of the communication bus.

In one aspect, the link circuit is configured to initiate a data transfer with the target hardware accelerator over the accelerator link and the data transfer occurs in response to an instruction from the host processor received by the hardware accelerator over the communication bus.

In another aspect, the link circuit includes a first memory-mapped to stream mapper circuit and a second memory-mapped to stream mapper circuit, each configured to convert data streams to memory mapped transactions and memory mapped transactions to data stream.

In another aspect, each memory-mapped to stream mapper circuit is configured to decrement a target address in a received transaction by an upper bound of an address range of the hardware accelerator.

In another aspect, the link circuit includes a first transceiver configured to send and receive stream data and a first retransmit engine coupled to the first transceiver and the first memory-mapped to stream mapper circuit.

In another aspect, the link circuit further includes a second transceiver configured to send and receive stream data and a second retransmit engine coupled to the second transceiver and the second memory-mapped to stream mapper circuit.

In one or more embodiments, a method may include receiving, within a first hardware accelerator, an instruction and a target address for a data transfer sent from a host processor over a communication bus, the first hardware accelerator comparing the target address with an upper bound of an address range corresponding to the first hardware accelerator, and, in response to determining that the target address exceeds the address range based on the comparing, the first hardware accelerator initiating a transaction with a second hardware accelerator to perform a data transfer using an accelerator link that directly couples the first hardware accelerator and the second hardware accelerator.

In one aspect, the accelerator link is independent of the communication bus.

In another aspect, the initiating the transaction includes initiating a memory mapped transaction and converting the memory mapped transaction to a data stream to be sent over the accelerator link.

In another aspect, the method includes, in response to receiving the transaction in the second hardware accelerator, the second hardware accelerator subtracting an upper bound of an address range of the second hardware accelerator from the target address and determining whether a result of the subtracting is within the address range of the second hardware accelerator.

In another aspect, the second hardware accelerator receives the transaction as a data stream and converts the data stream into a memory mapped transaction.

In another aspect, the method includes determining a status of a direct memory access circuit of the second hardware accelerator and initiating the data transfer in response to the status of the direct memory access circuit of the second hardware accelerator.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A system, comprising:
a host processor coupled to a communication bus;
a first hardware accelerator communicatively linked to the host processor through the communication bus; and
a second hardware accelerator communicatively linked to the host processor through the communication bus;
wherein the first hardware accelerator and the second hardware accelerator are directly coupled through an accelerator link independent of the communication bus; and
wherein the host processor is configured to initiate a data transfer between the first hardware accelerator and the second hardware accelerator directly through the accelerator link.

2. The system of claim 1, wherein the host processor is configured to communicate with the first hardware accelerator and the second hardware accelerator over the communication bus.

3. The system of claim 1, wherein the data transfer includes the first hardware accelerator accessing a memory of the second hardware accelerator through the accelerator link.

4. The system of claim 3, wherein the host processor is configured to access the memory of the second hardware accelerator by sending data including a target address to the first hardware accelerator, wherein the target address is translated by the host processor to correspond to the second hardware accelerator, and wherein the first hardware accelerator initiates a transaction to access the memory of the second hardware accelerator over the accelerator link based upon the target address.

5. The system of claim 1, wherein the second hardware accelerator is configured to adjust a target address for the data transfer by an upper bound of an address range for the second hardware accelerator in response to receiving a transaction via the accelerator link and determine whether the adjusted target address is local.

6. The system of claim 1, wherein the host processor is configured to initiate the data transfer between the first hardware accelerator and the second hardware accelerator based on a status of a direct memory access circuit of the second hardware accelerator coupled to the communication bus.

7. The system of claim 1, wherein the host processor is configured to automatically determine a sequence of the first hardware accelerator and the second hardware accelerator in a ring topology.

8. The system of claim 1, wherein the host processor is configured to track buffers corresponding to the first hardware accelerator and the second hardware accelerator using remote buffer flags.

9. A hardware accelerator, comprising:
an endpoint configured to communicate with a host processor over a communication bus;
a memory controller coupled to a memory local to the hardware accelerator; and
a link circuit coupled to the endpoint and the memory controller, wherein the link circuit is configured to establish an accelerator link with a target hardware accelerator also coupled to the communication bus, wherein the accelerator link is a direct connection between the hardware accelerator and the target hardware accelerator that is independent of the communication bus.

10. The hardware accelerator of claim 9, wherein the link circuit is configured to initiate a data transfer with the target hardware accelerator over the accelerator link and the data transfer occurs in response to an instruction from the host processor received by the hardware accelerator over the communication bus.

11. The hardware accelerator of claim 9, wherein the link circuit comprises:
   a first memory-mapped to stream mapper circuit and a second memory-mapped to stream mapper circuit, each configured to convert data streams to memory mapped transactions and memory mapped transactions to data stream.

12. The hardware accelerator of claim 9, wherein the link circuit is configured to adjust a target address in a received transaction by an upper bound of an address range of the hardware accelerator and determine whether the adjusted target address is local.

13. The hardware accelerator of claim 11, wherein the link circuit comprises:
   a first transceiver configured to send and receive stream data; and
   a first retransmit engine coupled to the first transceiver and the first memory-mapped to stream mapper circuit.

14. The hardware accelerator of claim 13, wherein the link circuit further comprises:
   a second transceiver configured to send and receive stream data; and
   a second retransmit engine coupled to the second transceiver and the second memory-mapped to stream mapper circuit.

15. A method, comprising:
   receiving, within a first hardware accelerator, an instruction and a target address for a data transfer sent from a host processor over a communication bus;
   the first hardware accelerator comparing the target address with an upper bound of an address range corresponding to the first hardware accelerator; and
   in response to determining that the target address exceeds the address range based on the comparing, the first hardware accelerator initiating a transaction with a second hardware accelerator to perform a data transfer using an accelerator link that directly couples the first hardware accelerator and the second hardware accelerator.

16. The method of claim 15, wherein the accelerator link is independent of the communication bus.

17. The method of claim 15, wherein the initiating the transaction includes initiating a memory mapped transaction and converting the memory mapped transaction to a data stream to be sent over the accelerator link.

18. The method of claim 15, further comprising:
   in response to receiving the transaction in the second hardware accelerator, the second hardware accelerator modifying the target address by an upper bound of an address range of the second hardware accelerator and determining whether the modified target address is within the address range of the second hardware accelerator.

19. The method of claim 18, wherein the second hardware accelerator receives the transaction as a data stream and converts the data stream into a memory mapped transaction.

20. The method of claim 15, further comprising:
   determining a status of a direct memory access circuit of the second hardware accelerator; and
   initiating the data transfer in response to the status of the direct memory access circuit of the second hardware accelerator.

* * * * *